United States Patent [19]

Harvey

[11] Patent Number: 4,639,111
[45] Date of Patent: Jan. 27, 1987

[54] PSEUDO FORMAT CAMERA WITH EXPOSURE CONTROL

[75] Inventor: Donald M. Harvey, Webster, N.Y.

[73] Assignee: Eastman Kodak Company, Rochester, N.Y.

[21] Appl. No.: 747,515

[22] Filed: Jun. 21, 1985

[51] Int. Cl.$^4$ ............................................. G03B 7/099
[52] U.S. Cl. .................................... 354/481; 354/106; 354/195.1; 354/222
[58] Field of Search ............... 354/410, 476, 481, 159, 354/106, 195.1, 222

[56] References Cited

U.S. PATENT DOCUMENTS

| | | | |
|---|---|---|---|
| 2,187,246 | 1/1940 | Nerwin | 88/1.5 |
| 2,879,691 | 3/1959 | Faulhaber | 354/222 |
| 3,212,422 | 10/1965 | Nerwin | 95/44 |
| 3,490,844 | 1/1970 | Sapp, Jr. | 355/40 |
| 3,536,408 | 10/1970 | Norwood | 354/481 |
| 3,961,348 | 6/1976 | Miyazuki | 354/159 |
| 4,176,930 | 12/1979 | Imura | 354/481 |
| 4,195,924 | 4/1980 | Stemme et al. | 354/197 |
| 4,357,102 | 11/1982 | Taren | 355/77 |
| 4,478,493 | 10/1984 | Yokota | 350/336 |
| 4,583,831 | 4/1986 | Harvey | 354/195.1 |

Primary Examiner—Russell E. Adams
Attorney, Agent, or Firm—Roger A. Fields

[57] ABSTRACT

A photographic camera enables pseudo telephoto and pseudo panoramic prints to be produced from exposed film frames by coding the film frame to identify the selected pseudo format. In the camera, a manually operated member is movable to a position corresponding to the actual field of view of the objective lens and to respective positions corresponding to pseudo telephoto or pseudo panoramic fields of view reduced from the actual field of view. Code means, responsive to movement of the manually operated member to a position corresponding to a pseudo telephoto or pseudo panoramic field of view, encodes a film frame with indicia representative of the selected pseudo field of view to identify the portion of the film frame covered by the pseudo field of view. The identified portion of the film frame can then be enlarged to produce a pseudo telephoto or pseudo panoramic print.

A photosensitive element in the exposure control system of the camera provides a measure of the brightness of light reflected from a subject to be photographed. Light control means, responsive to movement of the manually operated member to a position corresponding to a pseudo telephoto or pseudo panoramic field of view, controls the amount of light reaching the photosensitive element in accordance with the amount of light available to the selected pseudo field of view. Thus the portion of the film frame used to produce the pseudo telephoto or pseudo panoramic print can be more accurately exposed.

13 Claims, 14 Drawing Figures

| OPERATING MODE | PSEUDO PAN | ACTUAL ZOOM | | | | PSEUDO TELE (ZOOM) | | |
|---|---|---|---|---|---|---|---|---|
| CAMERA OBJECTIVE: | | | | | | | | |
| ACTUAL FOCAL LENGTH | 35mm | 35mm ↔ 80mm | | | | 80mm | 80mm | 80mm |
| EQUIVALENT FOCAL LENGTH | 35mm | SAME AS ACTUAL | | | | 120mm | 160mm | 200mm |
| MAGNIFICATION | 1.0X | 1.0X ↔ 2.3X | | | | 2.3X | 2.3X | 2.3X |
| CAMERA FINDER: | | | | | | | | |
| ACTUAL FOCAL LENGTH | 35mm | 35mm ↔ 80mm | | | | 120mm | 160mm | 200mm |
| MAGNIFICATION | 1.0X | 1.0X ↔ 2.3X | | | | 3.4X | 4.6X | 5.7X |
| FINDER IMAGE | ☺ 1:2 | ☺ 3½:5 | | | | ☺ 3½:5 | ☺ 3½:5 | ☺ 3½:5 |
| WIDTH-TO-LENGTH RATIO | 1:2 | 3½:5 | | | | 3½:5 | 3½:5 | 3½:5 |
| PORTION OF NEGATIVE USED TO MAKE PRINT | ☺ 16.4×32.8mm | ☺ 23×32.8mm | | | | ☺ 16.4×23.4mm | ☺ 12.8×16.3mm | ☺ 9.2×13.1mm |
| PRINT SIZE | 3½×7ins | 3½×5ins | | | | 3½×5ins | 3½×5ins | 3½×5ins |
| CODE FIDUCIAL | 1000 | 0000 | | | | 0100 | 0010 | 0001 |

PSEUDO FORMAT CAMERA WITH EXPOSURE CONTROL

CROSS REFERENCE TO RELATED APPLICATIONS

Reference is made to commonly assigned, copending patent applications. Ser. No. 717,053, filed Mar. 28, 1985 in the name of Donald M. Harvey and entitled PSEUDO TELEPHOTO—PSEUDO PANORAMIC CAMERA, and Ser. No. 743,470, filed June 11, 1985 in the name of Donald M. Harvey and entitled PSEUDO FORMAT CAMERA WITH ZOOM FINDER.

BACKGROUND OF THE INVENTION

1. Field of the Invention

The invention relates generally to a camera for enabling pseudo telephoto and pseudo panoramic prints to be produced from exposed film frames by coding a film frame to identify a selected pseudo format. More particularly, the invention relates to exposure control means in the camera for regulating the exposure of a film frame in accordance with the selected pseudo format.

2. Description of the Prior Art

A pseudo telephoto print is one that is made from a central portion of an exposure having the same width-to-length ratio, e.g., 3½:5, as that of the exposure. During the printing process the negative is masked at its upper, lower, left and right marginal zones, leaving the central portion of the negative unobscured. Alternatively, the film gate in the enlarger may be correspondingly masked or adjusted. Then, an enlargement is made of the central portion of the negative to provide a print with the same width-to-length ratio as that of the central portion. Thus the print will have a telephoto or close-up format.

A pseudo panoramic print is one that is made from a narrow portion of an exposure having a greater width-to-length ratio, e.g., 1:3, than that of the exposure. During the printing process the negative is masked at its upper and/or lower marginal zones, leaving the narrow portion of the negative unobscured. Alternatively, the film gate in the enlarger may be correspondingly masked or adjusted. Then, an enlargement is made of the narrow portion of the negative to provide a print with the same width-to-length ratio as that of the narrow portion. Thus the print will have a panoramic or elongate format.

Commonly assigned U.S. Pat. No. 3,490,844 granted Jan. 20, 1970 discloses a method of making a print of a selected portion of a subject to be photographed. The method comprises the following steps: (1) viewing the subject in the viewfinder of a camera; (2) manually adjusting mechanical masking members visible in the viewfinder to frame a selected portion of the subject; (3) exposing the film in the camera to obtain a latent image of the subject; (4) encoding the exposure on the film with indicia representative of the selected portion of the subject; (5) processing the film to obtain a negative of the latent image of the subject; and (6) sensing the indica to make a print of the selected portion of the subject from the negative.

When in U.S. Pat. No. 3,490,844 the selected portion of the subject has the same relative position in the viewfinder as a corresponding portion of the exposure, enlargement of the portion in the negative will provide a pseudo telephoto effect similar to the actual telephoto effect provided by a telephoto lens. Thus a pseudo telephoto print can be made during the printing process from an exposure taken without a telephoto lens.

Another patent, U.S. Pat. No. 4,357,102 granted Nov. 2, 1982, discloses a method of making a pseudo panoramic print from an exposure. According to the method, a window in the viewfinder of a camera has its upper and/or lower marginal zones masked off by an appropriate insert to provide a viewing area with a width-to-length ratio greater than 1:2 and preferably 1:3. Exposures are taken with the viewfinder window partially masked and, during the printing of the negatives, the film gate in the enlarger is correspondingly masked or provided with an aperture of the same width-to-length ratio as that of the unobscured portion of the viewfinder window. Printing paper with a similar width-to-length ratio is used. Prints can thus be obtained which have a panoramic or elongate format without using a panoramic lens.

Although U.S. Pat. No. 3,490,844 discloses a method of making a pseudo telephoto print from an exposure taken without a telephoto lens, and U.S. Pat. No. 4,357,102 discloses a method of making a pseudo panoramic print from an exposure taken without a panoramic lens, in each instance the exposure is made using an objective lens having a single or fixed focal length, probably around 45 mm. A 45 mm lens is a normal lens, as distinguished from a telephoto or wide angle lens, and is chosen to enable normal prints as well as pseudo telephoto or pseudo panoramic prints to be produced.

DESCRIPTION OF THE CROSS-REFERENCED APPLICATIONS

My first-filed cross-referenced application discloses a camera for exposing film frames for use in producing pseudo telephoto and pseudo panoramic prints. The camera makes it possible to obtain a pseudo telephoto print from a film frame exposed with the objective lens set at a moderate telephoto focal length, e.g., 80 mm, and to obtain a pseudo panoramic print from a film frame exposed with the objective lens set at a wide angle focal length, e.g., 28 mm. This is in addition to obtaining normal prints from film frames exposed with the objective lens set at a normal focal length, e.g., 50 mm. By providing a plurality of focal lengths for the objective lens, a greater range of pseudo telephoto and pseudo panoramic effects can be obtained as compared to the prior art devices shown in U.S. Pat. Nos. 3,490,844 and 4,357,102.

In the camera, the objective lens is adjustable to vary its angular field of view within a field range having a wide angle limit, i.e., 28 mm, and a moderate telephoto limit, i.e., 80 mm. A manually operated member is movable to a plurality of positions corresponding to respective fields of view within the field range of the objective lens, to adjust the lens to a selected field of view within such field range. Also, the manually operated member is movable to other positions corresponding to respective pseudo telephoto or pseudo panoramic fields of view outside the field range of the objective lens, when the lens is adjusted to its telephoto limit or to its wide angle limit. Code means, responsive to movement of the manually operated member to a position corresponding to a pseudo telephoto or pseudo panoramic field of view, encodes a film frame exposed with the objective lens at its wide angle or telephoto limit with indicia representative of the pseudo field of view. This enables the portion of the negative covered by the pseudo field of view to be identified for enlargement to produce a pseudo telephoto or pseudo panoramic print.

A liquid crystal display (LCD) masking unit is located in the viewfinder of the camera to provide various masking configurations in the finder field to frame a selected portion of a subject to be photographed. The respective masking configurations of the LCD corresponds to the pseudo telephoto and pseudo panoramic settings of the manually operated member. When the LCD is energized in accordance with the respective settings of the manually operated member, the LCD is rendered opaque to partially mask the finder field in various degrees. Thus the particular pseudo telephoto or pseudo panoramic format associated with the selected setting of the manually operated member may be viewed in the non-masked portion of the finder field.

Since the camera disclosed in my first-filed cross-referenced application uses a masking unit to partially mask the finder field in accordance with the selected pseudo telephoto setting, the view through the viewfinder is narrowed to the non-masked portion of the finder field. I have improved this situation in my second-filed cross-referenced application by providing (in place of the masking unit) a finder lens in the viewfinder which is adjustable to change its angular field of view to respective telephoto fields that define the pseudo telephoto formats. As a result, a selected pseudo telephoto format can be viewed in the full field of the viewfinder rather than in a (non-masked) portion of the finder field. This makes it possible for the viewfinder to show a full natural-size image of the subject to be photographed, which means that the view through the viewfinder can be on the same scale as the view with the unaided eye.

SUMMARY OF THE INVENTION

According to my invention, a pseudo telephoto-pseudo panoramic camera includes an exposure control photocell or the like for providing a measure of the brightness of light reflected from the subject to be photographed. Light control means in the camera controls the amount of reflected light reaching the photocell. The reflected light is controlled in accordance with the amount of light available to a selected pseudo telephoto or pseudo panoramic field of view reduced from the actual field of view of the objective lens. This is in contrast to many prior art devices which control the amount of light falling on the photocell in accordance with the amount of light available to the actual field of view of the objective lens. Thus in the pseudo telephoto-pseudo panoramic camera the portion of the film frame covered by the selected pseudo field of view can be more accurately exposed.

In a preferred embodiment of the pseudo telephoto-pseudo panoramic camera according to my invention, a manually operated member is movable to a position corresponding to the actual field of view of the objective lens and to respective positions corresponding to pseudo telephoto or pseudo panoramic fields of view narrower than the actual field of view of the objective lens. Code means, responsive to movement of the manually operated member to a position corresponding to a pseudo telephoto or pseudo panoramic field of view, encodes a film frame with indicia representative of the selected pseudo field of view to identify the portion of the film frame covered by the pseudo field of view. A photocell in the exposure control system of the camera is disposed to receive ambient light reflected from the subject to be photographed. The amount of light reaching the photocell is controlled in accordance with the position of the manually operated member. Thus the portion of the film frame covered by the selected pseudo telephoto or pseudo panoramic field of view will be exposed in proportion to the amount of light available to the selected pseudo field of view.

BRIEF DESCRIPTION OF THE DRAWINGS

The invention will be described in connection with the drawings, wherein.

DESCRIPTION OF THE PREFERRED EMBODIMENT

The invention is disclosed as being embodied in a 35 mm still picture camera. Because such a camera is well known, this description is directed in particular to photographic elements forming part of or cooperating directly with the disclosed embodiment. It is to be understood, however, that other elements not specifically shown or described may take various forms known to persons of ordinary skill in the art.

Figure 1:
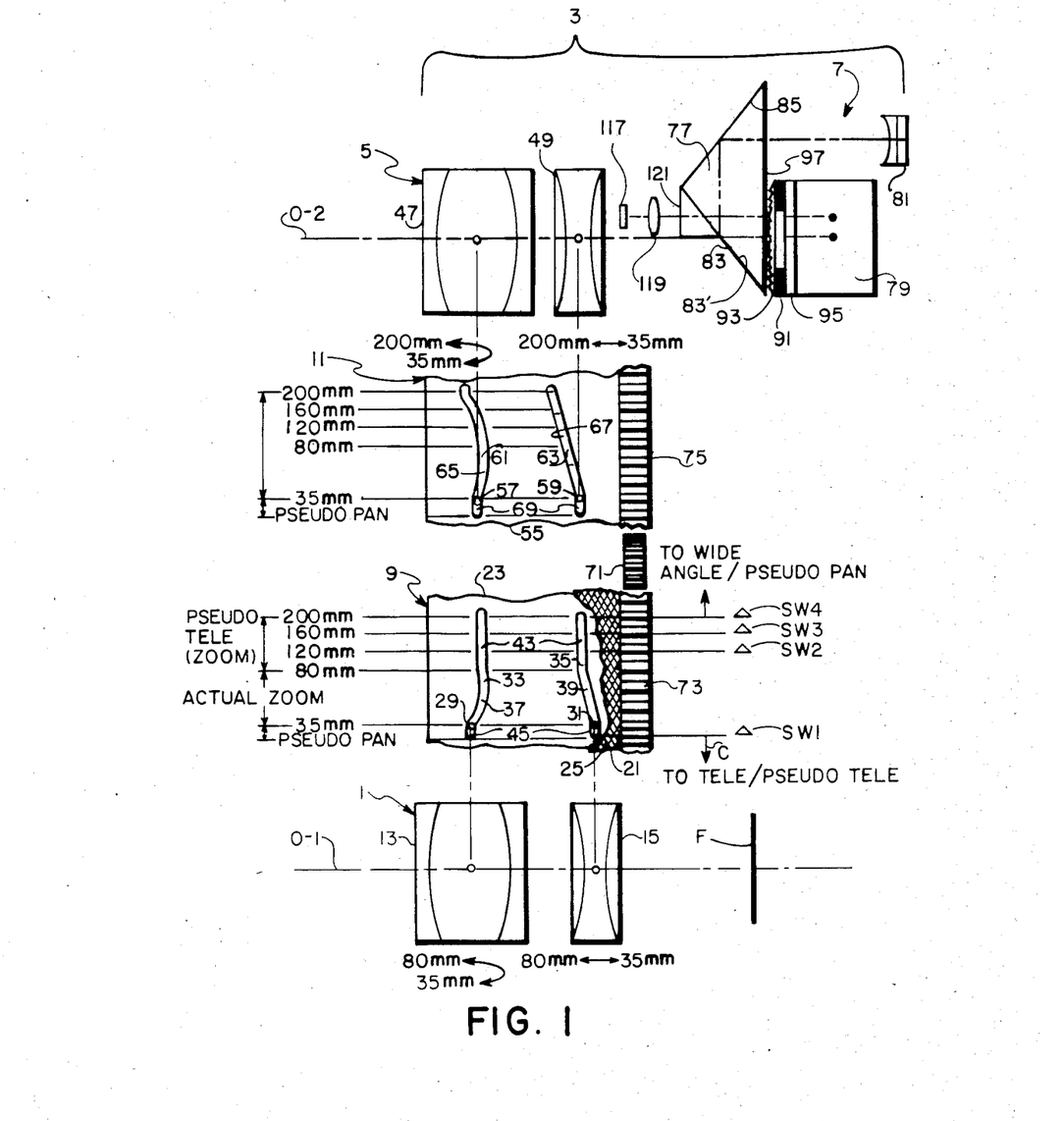
FIG. 1 is a diagram of a pseudo telephoto-pseudo panoramic camera having an exposure control system in accordance with a preferred embodiment of the invention.

Referring now to the drawings, and in particular to FIG. 1, there is shown a composite of certain details of a still picture camera for use with 35 mm film, such as the various color print films manufactured by Eastman Kodak Company. The camera includes an objective lens 1 for focusing an image of a subject being photographed on a frame section F of the film. Conventional means, such as a pressure plate and a pair of rails, not shown, support the film frame F in the focal plane of the objective lens to take the exposure. A direct-view (eye-level) optical viewfinder 3 in the camera includes a finder lens 5 and a Porro prism assembly 7 for viewing an erect image of the subject being photographed. Respective manually operated means 9 and 11 are disposed about the objective lens 1 and the finder lens 5 for adjusting the two lenses before taking the exposure.

The objective lens 1 in the camera is a known type of zoom lens, that is, a lens of variable focal length which can be adjusted continuously by movement of separate groups of elements in the lens to change the focal length of the lens. This is done in order to vary the angular field of view (coverage) of the objective lens 1 between a wide-angle limit and a telephoto limit. Alternatively, a lens assembly may be provided having a plurality of interchangeable elements for changing the focal length or angular field of view. As shown in FIG. 1, the objective lens 1 includes a front element section 13 which moves in a double action path along the optical axis O-1, first back (rearward) and then forward as the focal length of the lens is changed from a wide angle limit of, for exmple 35 mm, to a moderate telephoto limit of, for example, 80 mm. Conversely, a rear element section 15 of the objective lens 1 moves forward along the optical axis O-1 in an almost smooth, linear path as the focal length of the lens is adjusted from 35 mm to 80 mm. At the shortest focal length of the objective lens 1, i.e., the wide-angle limit 35 mm, the front and rear sections 13 and 15 of the lens are farthest apart and the angular field of view is approximately 63°. At the longest focal length of the objective lens 1, i.e., the moderate telephoto limit 80 mm, the angular field of view is approximately 28°. Thus the field range of the objective lens 1 is 63° to 28°.

Figure 3:
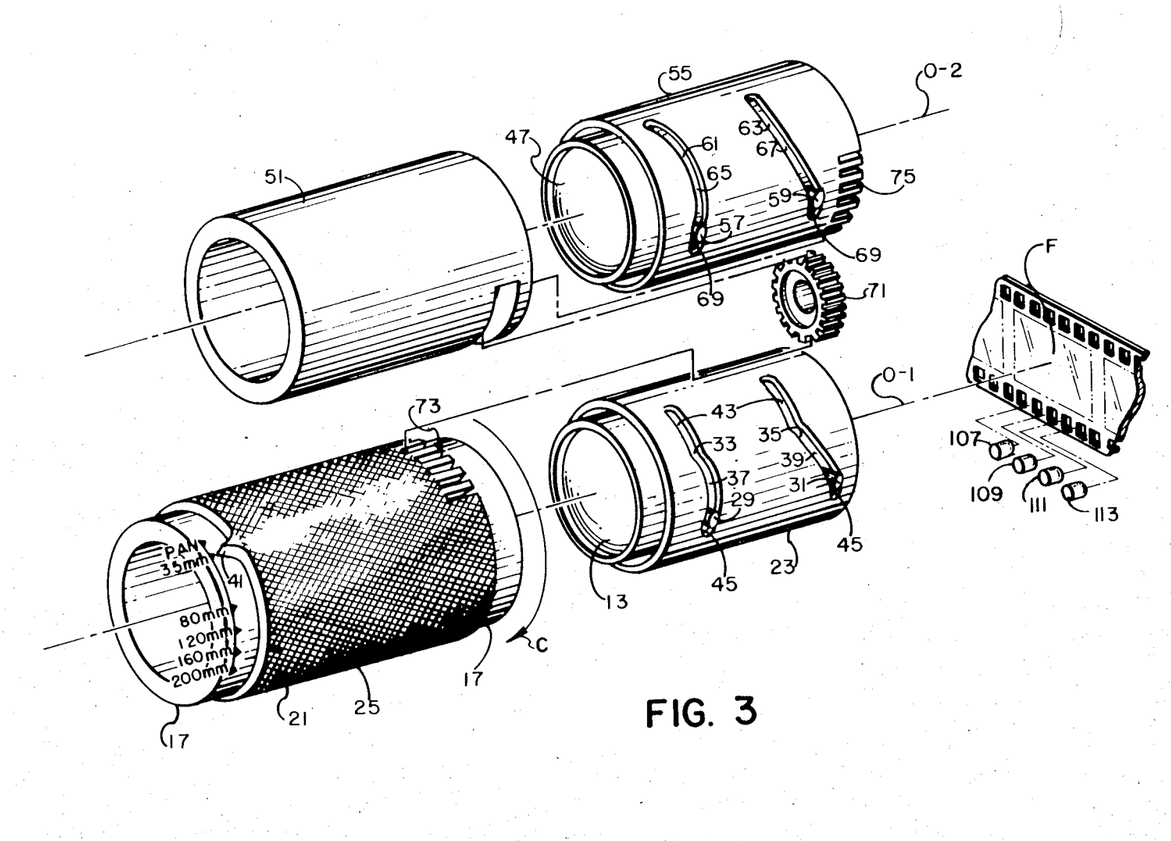
FIG. 3 is a partially exploded perspective view of a zoom objective lens, a zoom finder lens and manually operated means for adjusting the two lenses in the camera.
Figure 4:
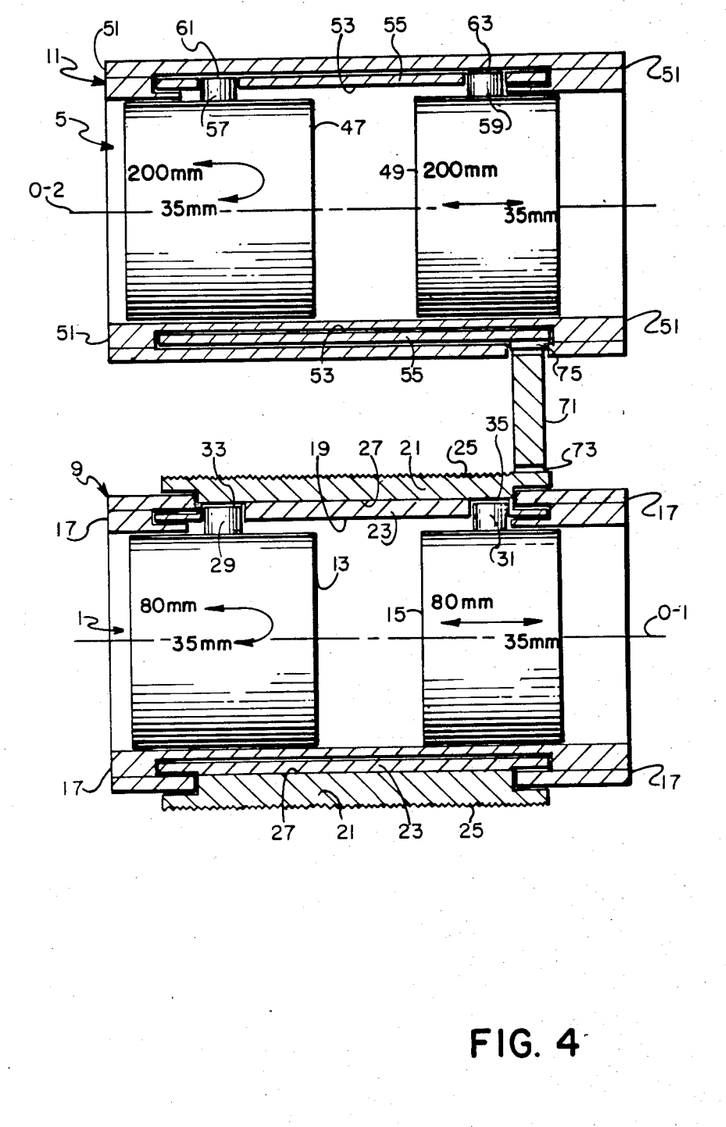
FIG. 4 is a partial sectional view of the two lenses and the manually operated means.

The manually operated means 9 for moving the front and rear sections 13 and 15 of the objective lens 1 to adjust the lens to a selected focal length from 35 mm to 80 mm is shown in FIGS. 1, 3 and 4. FIG. 1 shows the manually operated means 9 in a rolled-out (flat) elevational form. FIG. 3 shows such means 9 in an exploded perspective form. FIG. 4 shows the means 9 in a sectional form. As seen in FIG. 4, a cylindrical barrel 17 fixed to the camera body, not shown, supports the front and rear sections 13 and 15 of the objective lens 1 for movement along the optical axis O-1. The fixed barrel 17 has a semi-annular opening 19 which is bridged in light-trapping relation by an exterior zoom ring 21 and an interior cam ring 23. The zoom ring 21 has a knurled outer surface 25 and is secured at an inner surface 27 to the cam ring 23. The respective rings 21 and 23 are supported on exterior and interior surfaces of the barrel 17 for rotation relative to the barrel, about the front and rear sections 13 and 15 of the objective lens 1. The front and rear sections 13 and 15 have respective cam followers 29 and 31 which project into different-shaped cam slots 33 and 35 in the cam ring 23 to adjust the objective lens 1 from its 35 mm focal length to its 80 mm focal length. The different shape of the cam slots 33 and 35, and respective settings of the cam ring 23 for adjusting the objective lens 1 to the 35 mm focal length and the 80 mm focal length, are depicted in FIG. 1. When, as viewed in FIGS. 1 and 3, the cam ring 23 is rotated in a clockwise direction C (by turning the zoom ring 21 in the same direction) from the 35 mm setting to the 80 mm setting of the cam ring, the front section 13 of the objective lens 1 first moves rearward and then moves forward because of a curved segment 37 of the cam slot 33. Simultaneously, the rear section 15 of the objective lens 1 simply moves forward because of a straight, inclined segment 39 of the cam slot 35. This movement of the front and rear sections 13 and 15 adjusts the objective lens 1 to continuously change its focal length from 35 mm to 80 mm.

A pointer 41 is provided on the zoom ring 21 for alignment with respective indications of the 35 mm and 80 mm settings of the cam ring 23. As shown in FIG. 3, the indications are embossed on the outside of the cylindrical barrel 17.

As is apparent from FIG. 1, the cam ring 23 can be rotated in the clockwise direction C beyond its 80 mm setting (by similarly turning the zoom ring 21) to a plurality of pseudo telephoto settings 120 mm, 160 mm and 200 mm, without moving the objective lens 1 from its longest (telephoto) focal length 80 mm. This is possible because of respective, non-inclined, identical dwell segments 43 in the two cam slots 33 and 35. Conversely, the cam ring 23 can be rotated in a counter-clockwise direction beyond its 35 mm setting (by similarly turning the zoom ring 21) to a pseudo panoramic setting, without moving the objective lens 1 from its shortest (wide-angle) focal length 35 mm. This is possible because of respective, non-inclined, identical dwell segments 45 in the two cam slots 33 and 35. Indications of the pseudo telephoto settings 120 mm, 160 mm and 200 mm of the cam ring 23 and the pseudo panoramic setting of the cam ring are embossed on the outside of the cylindrical barrel 17, beyond the 80 mm and 35 mm indications on the barrel, for alignment with the pointer 45 on the zoom ring 21.

Like the objective lens 1, the finder lens 5 is a known type of zoom lens which can be adjusted continuously by movement of separate groups of elements to change its focal length. This is done in order to vary the angular field of view (coverage) of the finder lens 5 between a wide-angle limit and a telephoto limit. Alternatively, a lens assembly may be provided having a plurality of interchangeable elements for changing the focal length or angular field of view. As shown in FIG. 1, the finder lens 5 includes a front element section 47 which moves in a double action path along the optical axis O-2, first back (rearward) and then forward as the focal length of the lens is changed from a wide angle limit of, for example, 35 mm, to a telephoto limit of, for example, 200 mm. Conversely, a rear element section 49 of the finder lens 5 moves forward along the optical axis O-2 in an almost smooth, linear path as the focal length of the lens is adjusted from 35 mm to 200 mm. At the shortest focal length of the finder lens 5, i.e., the wide-angle limit 35 mm, the front and rear sections 47 and 49 of the lens are farthest apart and the angular field of view is approximately 63°. At the longest focal length of the finder lens 5, i.e., the telephoto limit 200 mm, the angular field of view is 12.5°. Thus the field range of the finder lens 5 is 63° to 12.5° (as compared to the field range of 63° to 28° for the objective lens 1).

The manually operated means 11 for moving the front and rear sections 47 and 49 of the finder lens 5 to adjust the lens to a selected focal length from 35 mm to 200 mm is shown in FIGS. 1, 3 and 4. As seen in FIG. 4, a cylindrical barrel 51 fixed to the camera body supports the front and rear sections 47 and 49 of the finder lens 5 for movement along the optical axis O-2. The fixed barrel 51 has an internal, annular cut-out 53 in which is located a cam ring 55. The cam ring 55 is supported in the cut-out 53 for rotation relative to the barrel 51, about the front and rear sections 47 and 49 of the finder lens 5. The front and rear sections 47 and 49 have respective cam followers 57 and 59 which project into different-shaped cam slots 61 and 63 in the cam ring 55 to adjust the finder lens 5 from its 35 mm focal length to its 200 mm focal length. The different shape of the cam slots 61 and 63, and the respective settings of the cam ring 55 for adjusting the finder lens 5 to the 35 mm and 200 mm focal lengths, as well as to several intermediate focal lengths 80 mm, 120 mm and 160 mm, are depicted in FIG. 1. When, as viewed in FIGS. 1 and 3, the cam ring 55 is rotated in the clockwise direction C from the 35 mm setting to the 200 mm setting of the cam ring, the front section 47 of the finder lens 5 first moves rearward and then moves forward because of a curved segment 65 of the cam slot 61. Simultaneously, the rear section 49 of the finder lens 5 simply moves forward because of a straight, inclined segment 67 of the cam slot 63. This movement of the front and rear sections 47 and 49 adjusts the finder lens 5 to continuously change its focal length from 35 mm to 200 mm.

As is apparent from FIG. 1, the cam ring 55 can be rotated in a counter-clockwise direction (opposite to the direction C) beyond its 35 mm setting to a pseudo panoramic setting, without moving the finder lens 5 from its shortest (wide-angle) focal length 35 mm. This is possible because of respective non-inclined, identical dwell segments 69 in the two cam slots 61 and 63.

A gear 71 couples the manually operated means 9, which adjusts the objective lens 1 to a selected focal length, and the manually operated means 11, which adjusts the finder lens 5 to a selected focal length, in a manner such that rotation of the zoom ring 21 to rotate the cam ring 23 for the objective lens will cause the cam ring 55 for the finder lens to be similarly rotated. As shown in FIGS. 1, 3 and 4, the gear 71 engages an arcuate array of teeth 73 on the zoom ring 21 and a like array of teeth 75 on the cam ring 55. When the zoom ring 21 is rotated in the clockwise direction C to move its pointer 41 from alignment with the "35 mm" indication on the fixed barrel 17 to alignment with the "80 mm" indication on the barrel, the objective lens 1 and the finder lens 5 are adjusted continuously from 35 mm focal lengths to 80 mm focal lengths and the cam rings 23 and 55 are adjusted to similar settings, shown in FIG. 1. When the zoom ring 21 is rotated in the clockwise direction C to move its pointer 41 from alignment wth the "80 mm" indication on the barrel 17 to successive alignment with the "120 mm", "160 mm" and "200 mm" indications on the barrel, the finder lens 5 is adjusted continuously from the 80 mm focal length to a 200 mm focal length and the cam rings 23 and 55 are adjusted to similar settings. However, the objective lens 5 remains stationary at its 80 mm focal length. When the zoom ring 21 is rotated in a counter-clockwise direction to move its pointer 41 from alignment with the "35 mm" indication on the barrel 17 to alignment with the "PAN" indication on the barrel, the cam rings 23 and 55 are adjusted to similar settings. However, the objective lens 1 and the finder lens 5 remain stationary at their 35 mm focal lengths.

Figure 2:
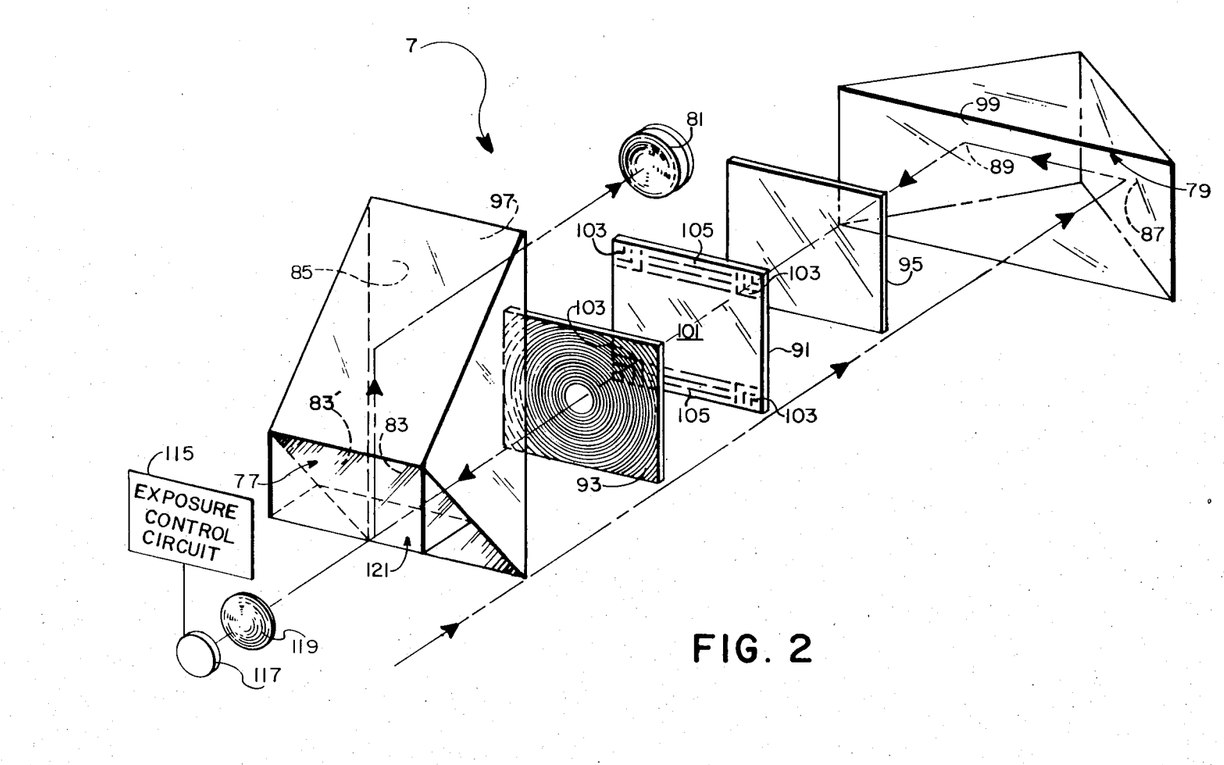
FIG. 2 is an exploded perspective view of a Porro prism erecting assembly for viewing an erect image of a subject in the viewfinder of the camera.

The Porro prism assembly 7 in the viewfinder 3 permits an erect image of the subject being photographed to be viewed through the finder lens 5 with the appropriate brightness. A single Porro prism would erect the image, but would leave it reversed left to right. To correct for this, as shown in FIGS. 1 and 2, there are provided two Porro prisms 77 and 79 which are placed hypotenuse to hypotenuse and at right angles to each other. FIG. 2 illustrates a light ray path through the two Porro prisms 77 and 79 to an eyelens 81. In essence, the two reflecting surfaces 83 and 85 of the prism 77 and the two reflecting surfaces 87 and 89 of the prism 79 cooperate to turn the image focused by the finder lens 5 upright as well as right-way-round.

Figure 5A:
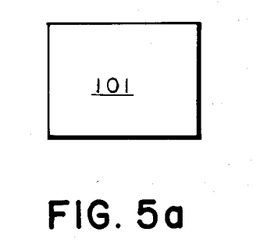
FIGS. 5a and 5b are elevation views of the finder field in the viewfinder, illustrating use of a liquid crystal display masking unit controlled by the manually operated means.
Figure 5B:
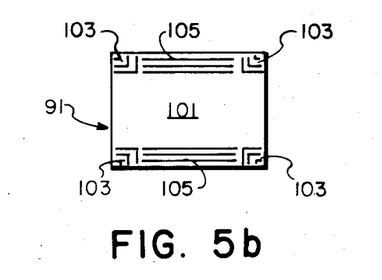

A liquid crystal display (LCD) masking unit 91 is sandwiched between a conventional Fresnel lens 93 and ground glass viewing screen 95. The Fresnel lens 93 and the viewing screen 95 in turn are located between the respective opposite halves of hypotenuse surfaces 97 and 99 of the two Porro prisms 77 and 79. The LCD masking unit is a variation of a known type of unit, such as described in U.S. Pat. No. 4,478,493, granted Oct. 23, 1984, and is depicted in FIG. 5B in a masking configuration in the finder field 101 of the viewfinder 3. The masking configuration corresponds to the panoramic setting of the cam ring 23 for the objective lens 1 and the similar setting of the cam ring 55 for the finder lens 5. As shown in FIG. 5B, the masking unit 91 comprises four sets of right-angle insulated strips 103 of transparent, electrically conductive material arranged in side-by-side relation in the respective corner zones of the finder field 101 and two sets of elongate insulated strips 105 of the same material arranged in side-by-side relation in the upper and lower marginal zones of the finder field. Preferably, each set of the right-angle strips 103 includes three strips, and each set of the elongate strips 105 includes three strips. FIG. 5A illustrates the finder field 101 as it appears with the masking unit 91 de-energized, which is the situation when the cam rings 23 and 55 are rotated from their 35 mm settings to their 200 mm settings or vice-versa. In this instance, the right-angle strips 103 and the elongate strips 105 are not visible in the finder field 97. FIG. 5B illustrates the finder field 101 as it appears with the masking unit 91 energized to provide a pseudo panoramic format, which is the situation when the cam rings 27 and 55 are in their panoramic settings. In this instance, the elongate strips 105 in the upper and lower marginal zones and the right-angle strips 103 in the corner zones are opaque in the finder field 101. In contrast to the electrically controlled LCD masking unit 91, a mechanically controlled masking unit may be provided in the viewfinder 3. An example of a mechanical unit is shown in U.S. Pat. No. 3,212,422, granted Oct. 9, 1965.

Four light emitting diodes (LED's) 107, 109, 111 and 113 are disposed in evenly spaced relation in the camera for selective energization to spot-expose various code fiducials in binary form on the film adjacent the frame section F, as shown in FIG. 3. Selective energization of the LED's 107, 109, 111 and 113 is controlled by individually closing respective switches SW1, SW2, SW3 and SW4, shown in FIG. 1. The closing of the switches SW1, SW2, SW3 or SW4 may be effected by a single closure member, not shown, on the cam ring 23, for example, as the cam ring is positioned selectively in its pseudo settings, i.e., pan, 120 mm, 160 mm and 200 mm. The binary form of the resulting code fiducial adjacent the film frame F indicates the particular pseudo setting of the cam ring 23. When the cam ring 23 is in its pseudo panoramic setting, the switch SW1 is closed and the LED 107 is energized. Thus the binary form of the code fiducial is 1000. When the cam ring 23 is in its 120 mm, 160 mm or 200 mm pseudo telephoto settings, the switches SW2, SW3 or SW4 are closed and the LED's 109, 111 or 113 are energized. Thus the binary form of the code fiducial is 0100, 0010 or 0001. When the cam ring 23 is rotated from its 35 mm setting to its 80 mm setting or vice-versa, the switches SW1-SW4 are open and none of the LED's are energized. Thus the binary form of the code fiducial is (in effect) 0000.

Although not shown, it may be desirable for the LED 107 to be energized each time the cam ring 23 is in a pseudo panoramic or pseudo telephoto setting. In this instance, the LED 107 would provide a reference or pseudo-indicator fiducial for use in the printing process and the LED's 109, 111 and 113 would provide the code fiducials. Thus the various codings might be 1000, 1100, 1010 and 1001 for the panoramic, 120 mm, 160 mm and 200 mm pseudo settings, respectively.

Figure 7:
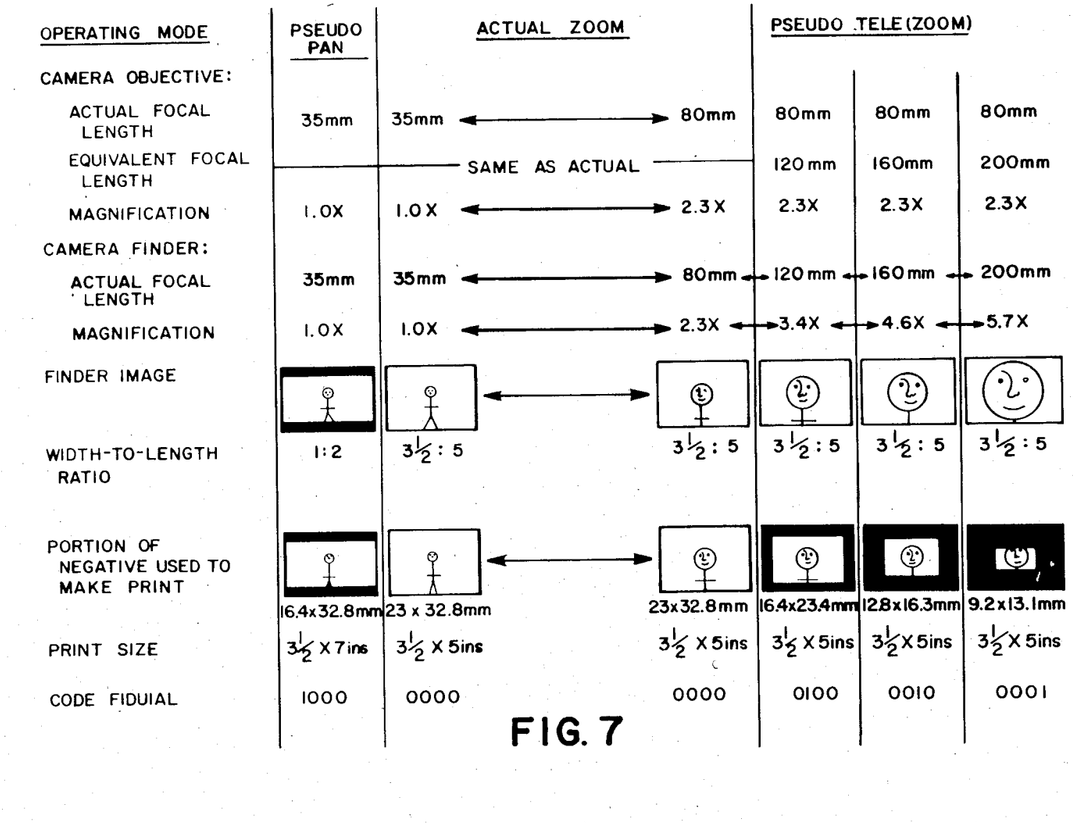
FIG. 7 is a chart for explaining how the camera is operated to expose a film frame for use in producing a pseudo telephoto or pseudo panoramic print.

Referring now to FIG. 7, there is shown a chart for understanding how the camera is used to expose film frames from which pseudo panoramic and pseudo telephoto prints as well as actual wide-angle to actual telephoto prints can be produced. For the most part, the chart is self-explanatory. For example, when the cam rings 23 and 55 are in their panoramic settings, the actual focal lengths of the objective lens 1 and the finder lens 5 are the wide angle limit 35 mm. The finder field 101 is masked by the LCD masking unit 91 as indicated in FIG. 7, and the code fiducial 1000 is exposed adjacent the film frame F, in response to the closing of the switch SW1. During the printing operation, sensing of the code fiducial 1000 causes the negative to be masked along its upper and lower marginal zones in conformity with the masking of the finder field 101. An enlargement is made of the narrow, non-masked portion of the negative, i.e., 16.4×32.8 mm, to provide a pseudo panoramic 3½×7 ins. print. When the cam rings 23 and 55 are in their 200 mm telephoto settings, the actual focal length of the objective lens 1 is its telephoto limit 80 mm, but the actual focal length of the finder lens 5 is 200 mm. The finder field 101 is not masked, and the code fiducial 0001 is exposed adjacent the film frame F in response to the closing of the switch SW4. During the printing operation, sensing of the code fiducial 0001 causes the negative to be masked along its upper, lower, left and right marginal zones as indicated in FIG. 7. An enlargement is made of the central, non-masked portion of the negative, i.e., 9.2×13.1 mm, to provide a pseudo telephoto 3½×5 ins. print. When the cam rings 23 and 25 are in their 120 mm telephoto settings, the actual focal length of the objective lens 1 is its telephoto limit 80 mm, but the actual focal length of the finder lens is 120 mm. The finder field 101 is not masked, and the code fiducial 0100 is exposed adjacent the film frame F in response to the closing of the switch SW2. During the printing operation, sensing of the code fiducial 0100 causes the negative to be masked along its upper, lower, left and right marginal zones as indicated in FIG. 7. An enlargement is made of the central, non-masked portion of the negative, i.e., 16.4×23.4 mm, to provide a pseudo telephoto 3½×5 ins. print. When the cam rings 23 and 25 are rotated from their 35 mm settings to their 80 mm settings or vice-versa, the focal length of the objective lens 1 and the finder lens 5 are continuously changed between 35 mm and 80 mm. The finder field is not masked and no code fiducial (0000) is exposed adjacent the film frame F, since each of the switches SW1-SW4 is open. Thus an enlargement is made of a substantial portion of the negative, i.e., 23×32.8 mm.

A conventional exposure control circuit 115 for controlling the diaphragm aperture and/or the shutter speed in the camera includes a photosensitive element, e.g., a photocell 117, shown in FIG. 2. Such a circuit is described, for example, in U.S. Pat. Nos. 4,493,547 and 4,515,457. As is well known, the photocell 117 is used to provide a measure of the brightness of light reflected from the subject being photographed. The photocell 117 is optically aligned with a light-collection lens 119 and a quarter prism 121. The quarter prism 121 is fixed to the Porro prism 77 at a location opposite the upper half of the surface 83 of the Porro prism, as viewed in FIG. 2. The surface 83 has a semi-reflecting coating 83' which permits light reflected from the subject through the finder lens 5 and the prism assembly 7 to be collected on the photocell 117.

When the cam ring 23 is in its pseudo panoramic setting, the finder field 101 is partially masked, leaving an unobscured portion of the finder field which defines a pseudo panoramic field of view of the subject being photographed. The non-masked portion of the finder field 101 is narrower than (reduced from) the actual field of view of the objective lens 1. Moreover, it takes in the same portion of the subject as is imaged on the portion of the film frame F to be enlarged to produce a pseudo panoramic print. This can be seen in FIG. 7 by comparing the finder image and the portion of the negative used to make a print—for the pseudo pan mode. Thus the amount of light reflected from the subject through the non-masked portion of the finder field 101 to the photocell 117 is proportional to the amount of reflected light that would be available to the objective lens 1 provided the lens had a similar panoramic field of view. This is in contrast to many prior art devices in which the amount of reflected light reaching the photocell is controlled in accordance with the amount of reflected light available to the actual field of view of the objective lens. Accordingly, the portion of the film frame F covered by the panoramic field of view can be accurately exposed in the camera in order to make a pseudo panoramic print from the negative.

When the cam ring 23 is in its 200 mm, 160 mm or 120 mm pseudo telephoto settings, the finder field 101 is not masked. However, the actual focal length of the finder lens 5 is either 200 mm, 160 mm or 120 mm. In each instance, the finder lens 5 has a telephoto field of view that is narrower than (reduced from) the actual field of view of the objective lens 1. Moreover, such telephoto field of view takes in the same portion of the subject as is imaged on the portion of the film frame F to be enlarged to produce a 200 mm, 160 mm or 120 mm pseudo telephoto print. This can be seen in FIG. 7 by comparing the finder image and the portion of the negative used to make a print—for the pseudo telemode. Thus the amount of light reflected from the subject through the finder lens 5 to the photocell 117 is controlled in accordance with the amount of reflected light that would be available to the objective lens 1 provided the lens had the respective telephoto fields of view. This is in contrast to many prior art devices in which the amount of reflected light reaching the photocell is controlled in accordance with the amount of reflected light available to the actual field of view of the objective lens. Accordingly, the portion of the film frame F covered by a 200 mm, 160 mm or 120 mm telephoto field can be accurately exposed in the camera in order to make a pseudo telephoto print from the negative.

Figure 6:
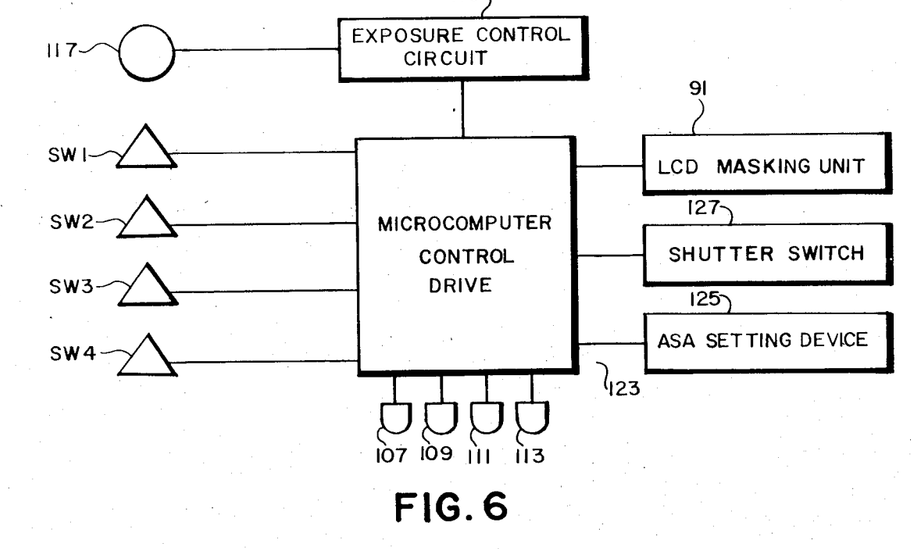
FIG. 6 is a diagram of control circuitry in the camera.

FIG. 6 depicts a known type microcomputer control device 123 for use with the LCD masking unit 91, the exposure control circuit 115 and the LED's 107, 109, 111 and 113. Examples of microcomputer-controlled cameras are disclosed in U.S. Pat. Nos. 4,295,715 and 4,509,843. An ASA (film speed) setting device 125 is connected to the microcomputer device 123 to limit the intensity of an energized LED in accordance with the film speed of the 35 mm film loaded in the camera. A shutter switch 127 is connected to the microcomputer device 123 to delay energization of an LED, even though one of the switches SW1-SW4 is closed, until a focal plane shutter, not shown, is opened to permit an exposure. When the focal plane shutter is opened, the shutter switch 127 is closed to energize an LED. Conversely, closing of the focal plane shutter causes the shutter switch 127 to re-open, thereby de-energizing the LED.

The microcomputer device 123 includes a typical look-up table of exposure values which are individually selected according to which one of the switches SW1-SW4 is closed and the measure of brightness of reflected light provided by the photocell 117. The selected exposure value is inputted to the exposure control circuit 115 to set the diaphragm temperature and/or the shutter speed.

While the invention has been described with reference to a preferred embodiment, it will be understood that various modifications may be effected within the ordinary skill in the art without departing from the scope of the invention. For example, instead of using the finder lens 5 to control the amount of reflected light reaching the photocell 17 in the pseudo telephoto mode, an LCD masking unit similar to the one disclosed in my first-filled cross-referenced application could be used for the same purpose. The masking unit would progressively mask the finder field as described in that application and would thereby attenuate the photocell to a corresponding extent.

Figure 8:
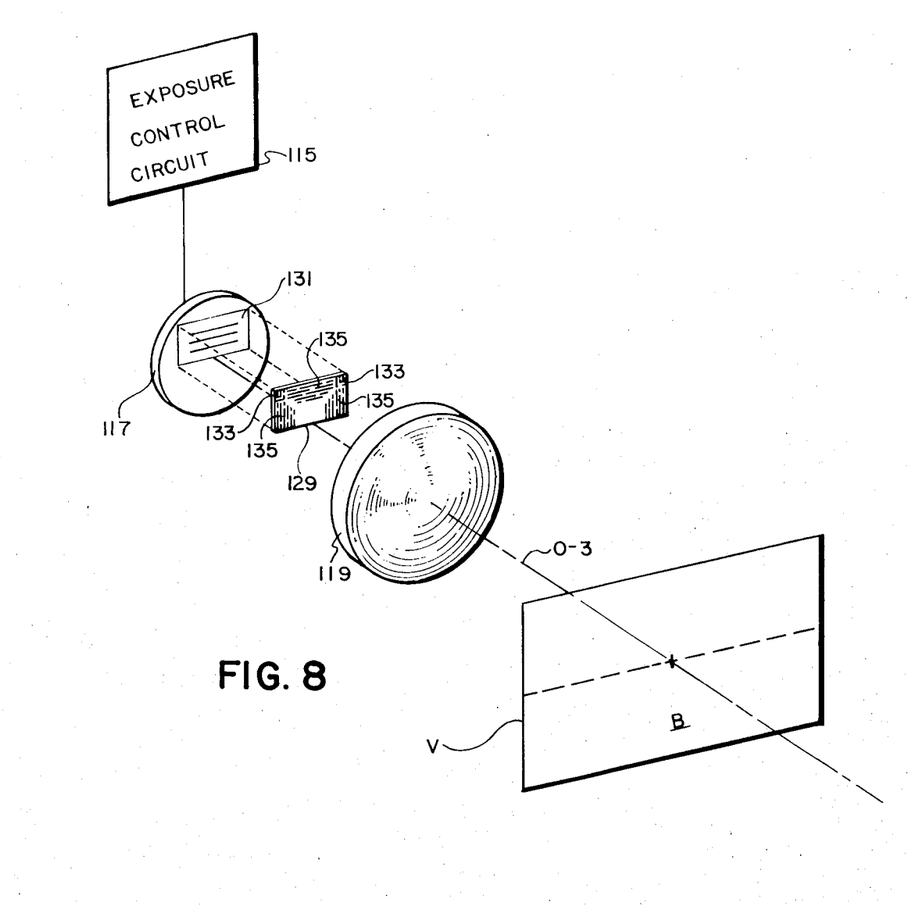
FIG. 8 is an exploded perspective view of an exposure control system in accordance with an alternate embodiment of the invention.
Figure 9A:
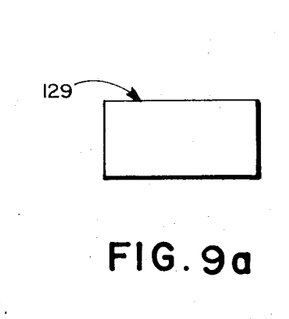
FIGS. 9a-9e are elevation views of a masking unit for attenuating a photocell in the exposure control system depicted in FIG. 8, illustrating various configurations of the masking unit.
Figure 9B:
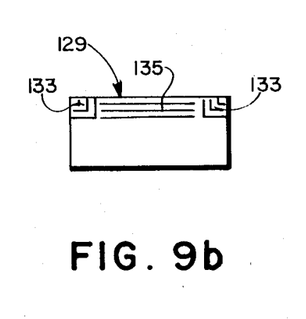
Figure 9C:
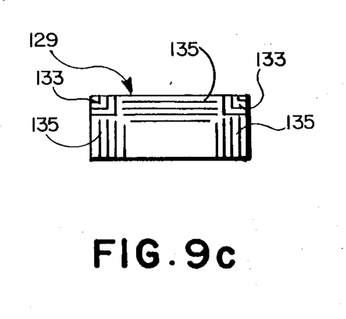
Figure 9D:
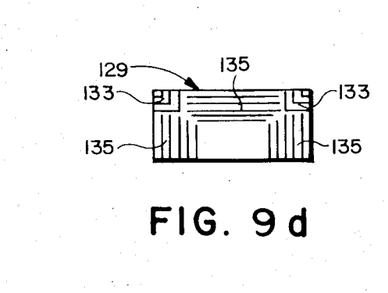
Figure 9E:
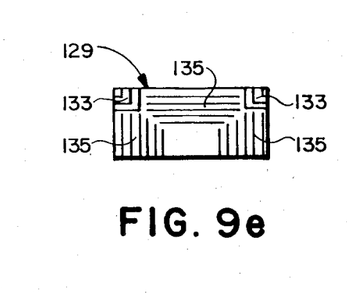

Alternatively, the photocell 117, shown in FIGS. 1 and 2, could be progressively masked to reduce its angle of acceptance. A way of doing this is shown in FIGS. 8 and 9b-9e. In FIG. 8, an LCD masking unit 129 is located over the light-sensitive area 131 of the photocell 117. The light-collection lens 119 directs light available to the bottom half B of the field of view V of the objective lens 1 onto the light-sensitive area 131 of the photocell 117. O-3 in FIG. 8 indicates the optical axis of the light-collection lens 119. The LCD masking unit 129 is a variation of a known type of unit, such as described in U.S. Pat. No. 4,478,493, granted Oct. 23, 1984, and is depicted in FIGS. 9b-9e in various masking configurations for masking the sensitive area 131 of the photocell 117 in corresponding amounts. The respective masking configurations correspond to the pseudo panoramic and pseudo telephoto settings of the cam ring 23 and are effected in response to the closing of the switches SW1-SW4. As shown in FIG. 9e, the masking unit 129 comprises two sets of right-angle insulated strips 133 of transparent electrically conductive material arranged in side-by-side relation in the respective upper corner zones of the mask area and three sets of elongate insulated strips 135 of the same material arranged in side-by-side relation in the upper, left and right marginal zones of the mask area. Preferably, each set of the right-angle strips 133 includes three strips, and each set of the elongate strips 135 includes six strips. When the right-angle strips 133 and the elongate strips 135 are selectively energized in accordance with the pseudo panoramic or pseudo telephoto settings of the cam ring 23, they are individually rendered opaque as shown in FIGS. 9b-9e. Thus the sensitive area 131 of the photocell 117 will be partially obscured in various degrees. FIG. 9a illustrates the mask area as it appears with the masking unit 129 de-energized, when the cam ring 23 is rotated from its 35 mm setting to its 80 mm setting or vice versa. In this instance, none of the right-angle strips 135 or the elongate strips 135 are visible. FIG. 9b illustrates the mask area as it appears with the masking unit 129 minimally energized, when the cam ring 23 is in its pseudo panoramic setting. In this instance, three of the elongate strips 135 in the upper marginal zone and both of the right-angle strips 133 in the corner zones are rendered opaque. FIG. 9c illustrate the mask area as it appears with the masking unit 129 further energized, when the cam ring 23 is in its 120 mm pseudo telephoto setting. In this instance, four of the elongate strips 135 in the upper, left and right marginal zones and both of the right-angle strips 133 in the corner zones are rendered opaque. FIG. 9d illustrates the mask area as it appears with the masking unit 129 even further energized, when the cam ring 23 is in its 160 mm pseudo telephoto setting. In this instance, five of the elongate strips 135 in the marginal zones and both of the right-angle strips 133 in the corner zones are rendered opaque. FIG. 9e illustrates the mask area as it appears with the masking unit completely energized, when the cam ring is in its 200 mm pseudo telephoto setting.

I claim:

1. A photographic camera for exposing a film frame for use in producing a pseudo telephoto print, said camera comprising:
   an objective lens;
   manually operated means for selecting a pseudo telephoto field of view reduced from the actual field of view of said objective lens;
   exposure control means including a photosensitive element disposed to receive ambient light; and
   light control means, responsive to the selection of a pseudo telephoto field of view, for controlling the amount of light reaching said photosensitive element in accordance with the amount of light available to the pseudo telephoto field of view, whereby the portion of the film frame covered by the pseudo field of view can be more accurately exposed.

2. A photographic camera for exposing a film frame for use in producing a pseudo telephoto or pseudo panoramic print, said camera comprising:
   an objective lens;
   manually operated means for selecting a pseudo telephoto or pseudo panoramic field of view reduced from the actual field of view of said objective lens;
   means cooperating with said manually operated means for encoding a film frame with indicia representative of a selected pseudo telephoto or pseudo panoramic field of view to identify the portion of the film frame covered by the selected pseudo field of view;
   exposure control means including a photosensitive element disposed to receive ambient light; and
   light control means cooperating with said manually operated means for controlling the amount of light reaching said photosensitive element in accordance with the amount of light available to the selected pseudo telephoto or pseudo panoramic field of view, whereby the portion of the film frame covered by the selected pseudo field of view can be more accurately exposed.

3. A camera as recited in claim 2, wherein said light control means includes adjustable means for preventing the amount of light reaching said photosensitive element from exceeding the amount of light available to the selected pseudo telephoto or pseudo panoramic field of view.

4. A camera as recited in claim 2, wherein said light control means including variable masking means for masking said photocell in different amounts corresponding to the selected pseudo telephoto or pseudo panoramic field of view.

5. A photographic camera for exposing a film frame for use in producing a pseudo telephoto print, said camera comprising:
   an objective lens;
   a viewfinder including means for changing the finder field of view selectively to at least one telephoto field narrower than the actual field of view of said objective lens;
   means cooperating with said changing means for encoding a film frame with indicia representative of said narrower telephoto field to identify the portion of the film frame covered by the narrower telephoto field; and
   exposure control means including a photosensitive element disposed to receive ambient light in the finder field of view to control the amount of light reaching said photosensitive element in accordance with the amount of light available to said narrower telephoto field, whereby the portion of the film frame covered by the narrower telephoto field can be more accurately exposed.

6. A photographic camera for exposing a film frame for use in producing a pseudo telephoto or pseudo panoramic print, said camera comprising:
   an objective lens;
   manually operated means movable to respective positions corresponding to pseudo telephoto or pseudo panoramic fields of view reduced from the actual field of view of said objective lens;
   code means, responsive to movement of said manually operated means to a position corresponding to a pseudo telephoto or pseudo panoramic field of view, for encoding a film frame with indicia representative of the pseudo telephoto or pseudo panoramic field to identify the portion of the film frame covered by the pseudo field of view;
   exposure control means including a photosensitive element disposed to receive ambient light; and
   light control means, responsive to movement of said manually operated means to a position corresponding to a pseudo telephoto or pseudo panoramic field of view, for controlling the amount of light reaching said photosensitive element in accordance with the amount of light available to the pseudo telephoto or pseudo panoramic field, whereby the portion of the film frame covered by the pseudo field of view can be more accurately exposed.

7. A photographic camera for exposing a film frame for use in producing a pseudo telephoto or pseudo panoramic print, said camera comprising:
   an objective lens;
   manually operated means movable to a position corresponding to the actual field of view of said objective lens and to respective positions corresponding to pseudo telephoto or pseudo panoramic fields of view reduced from said actual field of view;
   code means, responsive to movement of said manually operated means to a position corresponding to a pseudo telephoto or pseudo panoramic field of view, for encoding a film frame with indicia representative of the pseudo telephoto or pseudo panoramic field to identify the portion of the film frame covered by the pseudo field of view;
   exposure control means including a photosensitive element disposed to receive ambient light; and
   light control means for controlling the amount of ambient light reaching said photosensitive element in accordance with the position of said manually operated means, whereby the portion of a film frame covered by a pseudo telephoto or pseudo panoramic field of view can be more accurately exposed.

8. A camera as recited in claim 7, wherein said light control means is responsive to movement of said manually operated means to a position corresponding to a pseudo telephoto or pseudo panoramic field of view for preventing the amount of light reaching said photosensitive element from exceeding the amount of light available to the pseudo field of view.

9. A photographic camera for exposing a film frame for use in producing a pseudo telephoto or pseudo panoramic print, said camera comprising:
   an objective lens adjustable to change its angular field of view within a field range having a wide angle limit and a telephoto limit;
   manually operated means, supported for movement to a plurality of positions corresponding to respective fields of view within the field range of said objective lens, for adjusting the lens to a selected field of view, and supported for movement to other positions corresponding to respective pseudo panoramic or pseudo telephoto fields of view outside the field range of said objective lens when the lens is adjusted to said wide angle or telephoto limit;
   code means, responsive to movement of said manually operated means to a position corresponding to a pseudo panoramic or pseudo telephoto field of view, for encoding a film frame exposed with said objective lens at its wide angle or telephoto limit with indicia representative of the pseudo field of view to identify the portion of the film frame covered by the pseudo field;
   exposure control means including a photosensitive element disposed to receive ambient light; and
   light control means cooperating with said manually operated means for controlling the amount of light reaching said photosensitive element in accordance with the respective positions of the manually operated means, whereby the portion of a film frame covered by a pseudo panoramic or pseudo telephoto field of view can be more accurately exposed.

10. A photographic camera for exposing a film frame for use in producing a pseudo telephoto print, said camera comprising:
    an objective lens adjustable to change its angular field of view within a field range having a telephoto limit;
    a viewfinder having a finder lens adjustable to change the finder field of view to respective fields within said field range of the objective lens and to a plurality of telephoto fields narrower than the possible fields of said objective lens;
    means, coupled with said objective lens and said finder lens for adjusting the finder lens and the objective lens selectively to similar fields to view a selected similar field through said finder lens, and for adjusting the finder lens selectively to said narrower telephoto fields to view a selected telephoto field through said finder lens when said objective lens is at its telephoto limit;
    means, responsive to adjustment of said finder lens to a selected narrrower telephoto field, for encoding a film frame exposed with said objective lens at its telephoto limit with indicia representative of the selected telephoto field to identify the portion of the film frame covered by the selected telephoto field;

exposure control means including a photosensitive element; and optical means for directing ambient light in the finder field of view onto said photosensitive element to control the amount of ambient light reaching the photosensitive element in accordance with the selected narrower telephoto field, whereby the portion of the film frame covered by the selected telephoto field can be more accurately exposed.

11. An exposure control for a pseudo telephoto camera having an objective lens for focusing an image of a subject on a film frame and a manually operated device movable to select a pseudo telephoto field of view reduced from the actual field of view of the objective lens to cover only a portion of the subject, said exposure control comprising:

photosensitive means disposed to receive light reflected from the subject for providing a measure of the brightness of the light; and light control means, responsive to movement of the manually operated device to select the pseudo telephoto field of view, for controlling the amount of light reaching said photosensitive means in proportion to the amount of light available to the pseudo telephoto field of view.

12. An exposure control as recited in claim 11, wherein said light control means includes a viewfinder having a finder lens adjustable to change the finder field of view to an actual telephoto field of view which is similar to the pseudo telephoto field of view, and said photosensitive means is located to receive light in the finder field of view.

13. An exposure control as recited in claim 11, wherein said light control means includes a masking device for attenuating the light reaching said photosensitive means in proportion to the amount of light available to the pseudo telephoto field of view.

* * * * *